United States Patent [19]

Reinagel et al.

[11] Patent Number: 4,792,904
[45] Date of Patent: Dec. 20, 1988

[54] COMPUTERIZED FLIGHT INSPECTION SYSTEM

[75] Inventors: Frederick G. Reinagel, Buffalo; Allen B. Johnson, North Tonawana, both of N.Y.

[73] Assignee: LTV Aerospace and Defense Company, Dallas, Tex.

[21] Appl. No.: 140,875

[22] Filed: Jan. 6, 1988

Related U.S. Application Data

[63] Continuation-in-part of Ser. No. 65,075, Jun. 17, 1987, abandoned, which is a continuation-in-part of Ser. No. 946,124, Dec. 24, 1986, abandoned, which is a continuation-in-part of Ser. No. 699,333, Feb. 7, 1985, abandoned.

[51] Int. Cl.⁴ ............................................. G06F 15/50
[52] U.S. Cl. .................................... 364/429; 364/428; 364/571.04; 73/178 T; 358/103; 340/953
[58] Field of Search ............................. 364/428–430, 364/439, 443, 456, 571; 358/103; 340/947, 948, 951, 953, 954, 955, 956; 73/178 T

[56] References Cited

U.S. PATENT DOCUMENTS

| | | | |
|---|---|---|---|
| 4,144,571 | 3/1979 | Webber | 364/429 |
| 4,210,930 | 7/1980 | Henry | 358/103 |
| 4,385,354 | 5/1983 | Hornfeld et al. | 340/953 |
| 4,534,000 | 8/1985 | Bliss | 364/429 |
| 4,584,646 | 4/1986 | Chan et al. | 364/443 |

Primary Examiner—Gary Chin
Attorney, Agent, or Firm—Brooks & Kushman

[57] ABSTRACT

A computerized flight inspection system is disclosed. The system of the present invention may be utilized to generate an accurate reference location with respect to an airport runway for an aircraft having an inertial navigation system. A selected geometric pattern having a highly unambiguous autocorrelation function is placed on at least one end of the runway. A video line scanning camera mounted to the aircraft is then utilized to scan the geometric pattern in a line generally perpendicular to the line of flight. The output of the video line scanning camera is then correlated with a stored reference pattern to generate a signal indicative of the detection of the geometric pattern on the runway. A laser altimeter is mounted to the aircraft and utilized to generate an accurate signal indicative of the aircraft altitude with respect to the runway pattern. The outputs of the correlation circuit and the laser altimeter are then utilized to correct data from the inertial navigation system.

20 Claims, 4 Drawing Sheets

COMPUTERIZED FLIGHT INSPECTION SYSTEM

This is a continuation-in-part of co-pending application Ser. No. 065,075, filed on 6-17-87, abandoned, which is a continuation-in-part of application Ser. No. 946,124, filed 12-24-86, abandoned, which is a continuation-in-part of the present application Ser. No. 699,333 filed 2-7-85, abandoned.

BACKGROUND OF THE INVENTION

The present invention relates in general to aircraft navigation systems and in particular to systems for generating an accurate reference location with a respect to a runway. Still more particularly, the present invention relates to systems for generating position correction signals from optical observation for utilization in the inspection of instrument landing systems.

Instrument landing systems are well known in the prior art. Such systems can be utilized to permit appropriately equipped aircraft to land on airport runways under highly hazardous conditions. However, in order to utilize such systems it is necessary to periodically inspect and calibrate these systems to ensure that the electronic indications of aircraft location are sufficiently accurate with respect to actual aircraft location.

Highly accurate inertial navigation systems are known which generate relatively accurate indications of aircraft location from a selected point; however, these systems are not sufficiently accurate to permit the evaluation of Instrument Landing Systems (ILS). Thus, a more accurate method of generating aircraft location must be utilized.

In order to generate highly accurate reference locations of inspection aircraft, prior art systems have utilized a variety of approaches. For example, one system utilizes a ground-based optical tracking device such as a theodolite to generate a reference location which may be compared to the electronically generated location provided by the instrument landing system. Other systems utilize ground-based optical reflectors which can be utilized to allow an aircraft equipped with light sources and detectors to obtain a reference location.

All such known systems require extensive ground-based equipment and/or operators to generate a reference location of the inspection aircraft. As such, some of these systems are subject to human error and some can only be operated during daylight hours in acceptable weather conditions. Thus, it should be apparent that a need exists for a flight inspection system which does not require extensive ground-based equipment or personnel and which generates a highly accurate reference location with respect to an airport runway.

SUMMARY OF THE INVENTION

It is therefore one object of the present invention to provide an improved flight inspection system.

It is another object of the present invention to provide an improved flight inspection system which does not require extensive ground-based equipment.

It is yet another object of the present invention to provide an improved flight inspection system which does not require ground-based support personnel.

It is still another object of the present invention to provide an improved flight inspection system which utilizes optical observations to generate position correction signals for utilization in the inspection of instrument landing systems.

The foregoing objects are achieved as is now described. A selected geometric pattern having a highly unambiguous autocorrelation function is placed on at least one end of an airport runway. A video line scanning camera mounted to the aircraft is then utilized to scan the geometric pattern in a line generally perpendicular to the line of flight. The output of the video line scanning camera is then correlated with a stored reference pattern to generate a signal indicative of the detection of the geometric pattern on the runway. A laser altimeter is mounted to the aircraft and utilized to generate an accurate signal indicative of the aircraft altitude with respect to the runway pattern.

The outputs of the correlation circuit and the laser altimeter are then utilized to correct data from the inertial navigation system.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 2, 3, 4, 5:
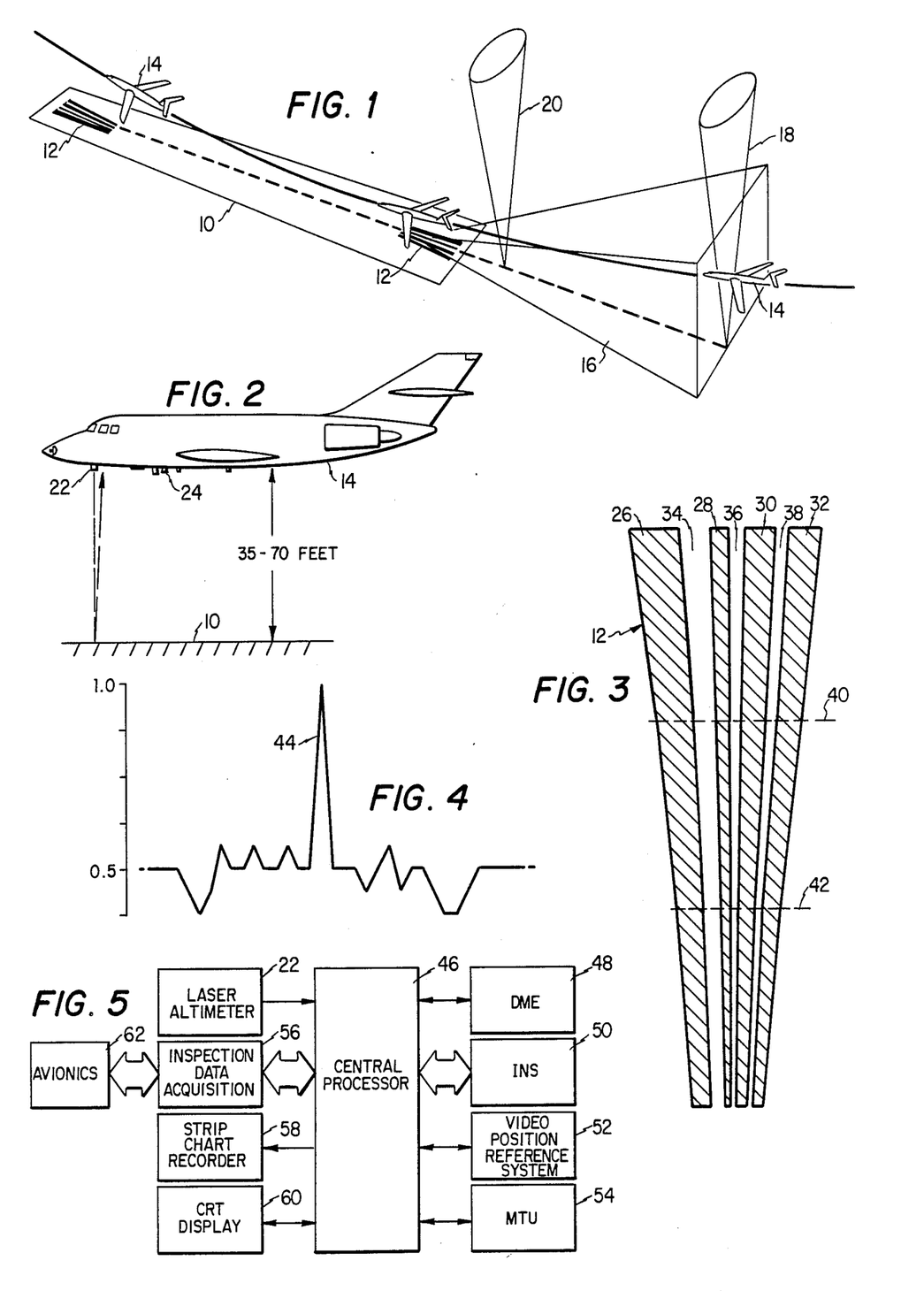
FIG. 1 is a perspective view of an airport runway equipped with the novel flight inspection feature of the present invention.
FIG. 2 is a side view of an aircraft equipped with the novel flight inspection system of the present invention.
FIG. 3 is a plan view of a runway pattern which may be utilized with the novel flight inspection system of the present invention.
FIG. 4 is a diagram of the autocorrelation function of the runway pattern depicted in FIG. 3.
FIG. 5 is a block diagram of the novel flight inspection system of the present invention.

With reference now to the figures and in particular with reference to FIG. 1 there is depicted a perspective view of an airport runway equipped with the novel flight inspection feature of the present invention. As can be seen, runway 10 is depicted as having a geometric pattern 12 disposed on each end thereof. As will be explained in greater detail herein, geometric pattern 12 is selected to have a highly unambiguous autocorrelation function and must be positioned across runway 10 with an accuracy of 0.5 inch for Category III system inspections. Geometric pattern 12 is preferably located at the extreme ends of runway 10 to reduce wear due to aircraft wheel marks and exhaust gases. Geometric pattern 12 must not be obscured by dust, sand or snow in order to operate the system of the present invention; however, geometric pattern 12 is preferably approximately six feet wide and eighteen feet long and thus the area to be kept clear is quite small. Additionally, because of the nature of the autocorrelation operation, the system is tolerant to a considerable degree of pattern degradation.

Aircraft 14 is utilized to fly over geometric pattern 12 to obtain accurate reference position data. Preferably, the novel system of the present invention is initiated as aircraft 14 enters Instrument Landing System (ILS) envelope 16 by middle marker 18. Also depicted is inner marker 20, as those skilled in the art will appreciate.

Referring now to FIG. 2, there is depicted a side view of an aircraft 14 which illustrates certain features of the novel flight inspection system of the present invention. As can be seen, as aircraft 14 passes over runway 10 at an altitude of approximately thirty-five to seventy feet, a laser altimeter 22 is utilized to measure the altitude of aircraft 14. Those skilled in the art will appreciate that such laser altimeters are readily available in the industry and will provide altitude accuracy within a few inches. Laser altimeter 22 is utilized as an input to the position-determining computations of the present invention. Also depicted in FIG. 2 is digital scanning camera 24 which is utilized to scan geometric pattern 12 to provide reference position data as will be explained herein. As an installation consideration, scanning camera 24 should be positioned as closely spaced as possible to aircraft 14's inertial navigation system. As will be explained herein, roll, pitch and yaw information from the inertial navigation system will be utilized to correct the output of line scanning camera 24 and such an installation will reduce errors due to fuselage deflections.

With reference now to FIG. 3, there is depicted a plan view of geometric pattern 12 as installed on runway 10. While a specific pattern is depicted, the particular pattern selected is merely one of many patterns which exhibit a highly unambiguous autocorrelation function. The pattern depicted is constructed utilizing bright white bands 26, 28, 30 and 32, which are separated by black bands 34, 36 and 38. In the particular pattern depicted, band 26 is three units wide, band 28 is one unit wide and bands 30 and 32 are each two units wide. Similarly, black band 34 is two units wide and bands 36 and 38 are each one unit wide. It should also be noted that the aforementioned bands are not bounded by straight lines, but rather three separate contiguous segments of straight lines which change their rate of convergence at intersecting lines 40 and 42 to approximate an exponential function.

Referring now to FIG. 4, there is depicted a diagram of the autocorrelation function of geometric pattern 12 of FIG. 3. As can be seen, peak 44 of the autocorrelation function is almost twice as great in magnitude than all remaining peaks in the autocorrelation function. In this manner, a reference pattern for geometric pattern 12 can be correlated with a scan across pattern 12 which is generally parallel to lines 40 and 42 and the resultant correlation function will indicate with a high degree of lateral resolution and certainty when a "match" has occurred.

With reference now to FIG. 5, there is depicted a block diagram of the novel flight inspection system of the present invention. As can be seen, the flight inspection system is controlled by central processor 46. Central processor 46 is preferably a suitably programmed single-band computer, such as the model HK-68-3, manufactured by Heurikon Corporation of Madison, Wis.

Coupled to central processor 46 are laser altimeter 22 and precision distance measuring equipment (DME) 48 which are utilized by central processor 46, together with the output of video position reference system 52 to generate an accurate position with respect to runway 10 which may be utilized to correct Inertial Navigation System (INS) 50 for position offset and drift. In this manner, aircraft position data generated by INS 50 is thus made sufficiently accurate to permit evaluation of Category III Instrument.

In a preferred mode of the present invention, INS 50 is preferably a Delco Carousel IV Inertial Navigation System. The Delco Carousel IV INS provides approximately an order of magnitude of improvement over conventional INS systems with regard to zero offset of the "x" axis and the "y" axis accelerometers. Also coupled to central processor 46 are strip chart recorder 58 and display 60. Strip chart recorder 58 may be implemented utilizing any suitable recorder and may be utilized to provide complete recording of each test flight.

The use of a wide range of avionics equipment 62 is accommodated with this preferred mode of the present invention. Test receivers/transmitters for the checking of ILS (Instrument Landing Systems), VOR (VHF Omnidirection Range), TACAN, MKR (Marker Beacons), and communication equipment are connected to an Inspection Data Acquisition subsystem 56 containing suitable translation interfaces and a slave microprocessor which organizes, formats and controls the data for subsequent use by the central processor 46.

All avionics data received by the central processor, plus positional data computed thereby, are available for recording on a magnetics tape unit 54 for long-term storage. These data are also available for visual presentation on the CRT display unit 60 or strip chart recorder 58.

Figure 6:
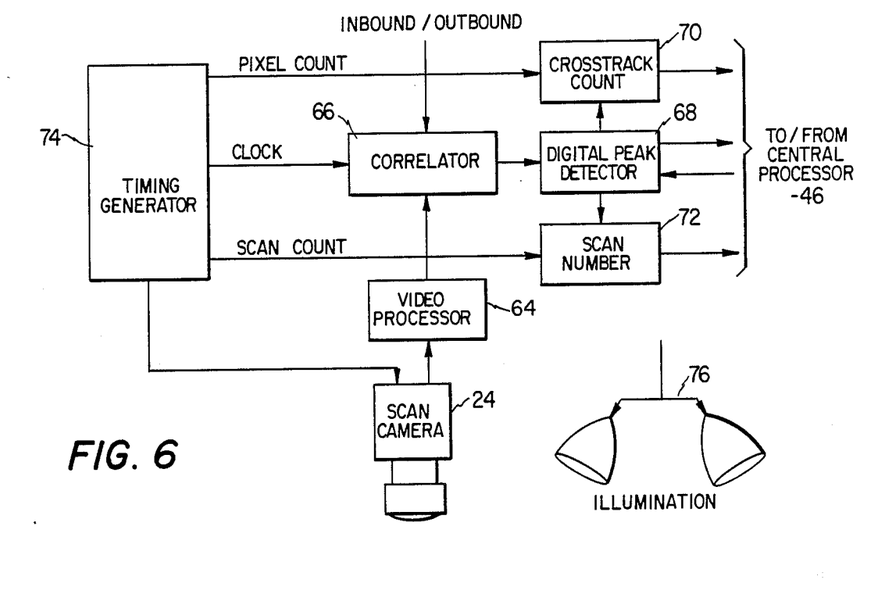
FIG. 6 is a block diagram of the video position references system of the novel flight inspection system of the present invention.

Referring now to FIG. 6, there is depicted a block diagram of video position reference system 52 of FIG. 5. As can be seen video signals indicative of the scanned pattern are generated by line scanning camera 24. These signals are then processed by video processor 64. Video processor 64 is utilized to produce a quantized serial data stream having a bit state indicative of the detection of "black" or "white" by digital line scanning camera 24.

The serial data stream from video processor 64 are then coupled to correlator 66 and compared to a stored reference pattern therein. In a preferred mode of the present invention, correlator 66 is provided by a monolithic 64 bit digital correlator such as the TDC 1023J, manufactured by TRW, Inc. of Redondo Beach, Calif. A correlation score is generated for each comparison and that correlation score is then compared to the highest correlation score previously obtained and stored in digital peak detector 68. If the current correlation score is higher than the score stored in digital peak detector 68, the new score is stored within digital peak detector 68 and strobe signals are generated which update the data in both cross-track register 70 and scan number register 72.

As each strobe signal is coupled to cross-track register 70, that register stores the pixel count generated by timing generator 74. Timing generator 74 generates a pixel count beginning with zero at the beginning of each scan of digital line scanning camera 24. Thus, the value stored in cross-track register 70 will correspond to the lateral position of the runway reference pattern within each scan of digital scanning camera 24.

Similarly, scan number register 72 acquires and holds the number of the scan during which the maximum correlation score occurs. The scan register is generated by timing generator 74 and is set to zero each time central processor 46 reads a frame of data, and advances at the scan rate. In a preferred embodiment of the present invention, the scan rate is preferably 200 scans per second. Additionally, digital peak detector 68 is also reset to zero at the beginning of each data frame.

The occurrence of the runway pattern detection is selectively defined as the highest correlation score above some predetermined threshold value. For example, a correlation score of 56 or more bit matches out of 64. Such a threshold will be high enough to discriminate against random background image patterns and will also tolerate some degree of reference pattern degradation. An event detection permits the pattern lateral position (determined by the contents of cross-track register 70) and the time of occurrence (determined by the content of scan number register 72) to be combined by central processor 46 with aircraft altitude (as detected by laser altimeter 22) and aircraft attitude (as detected by Inertial Navigation System 50) to compute the actual position of the aircraft relative to runway 10 with a precision sufficient for instrument landing system inspection.

Figure 8:
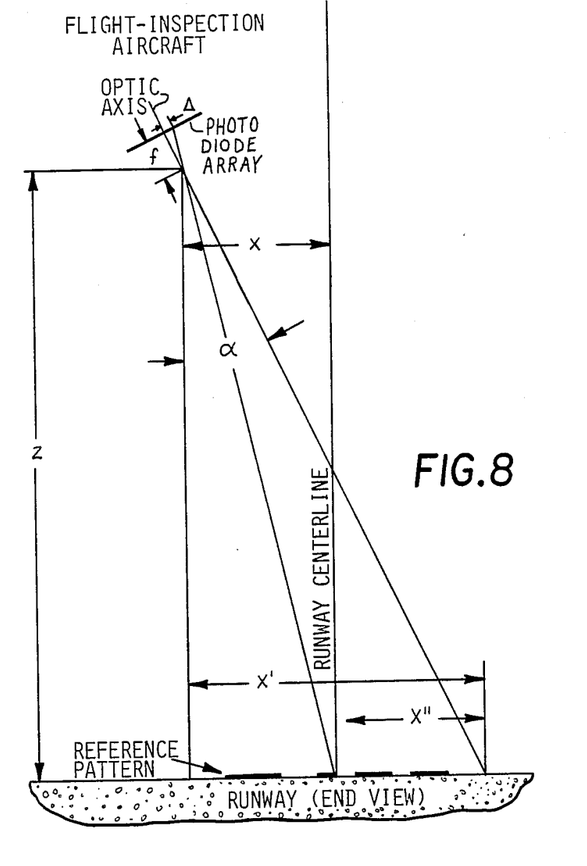
FIG. 8 is a diagrammatic end view of an aircraft and runway having the runway pattern depicted in FIG. 3.
Figure 9:
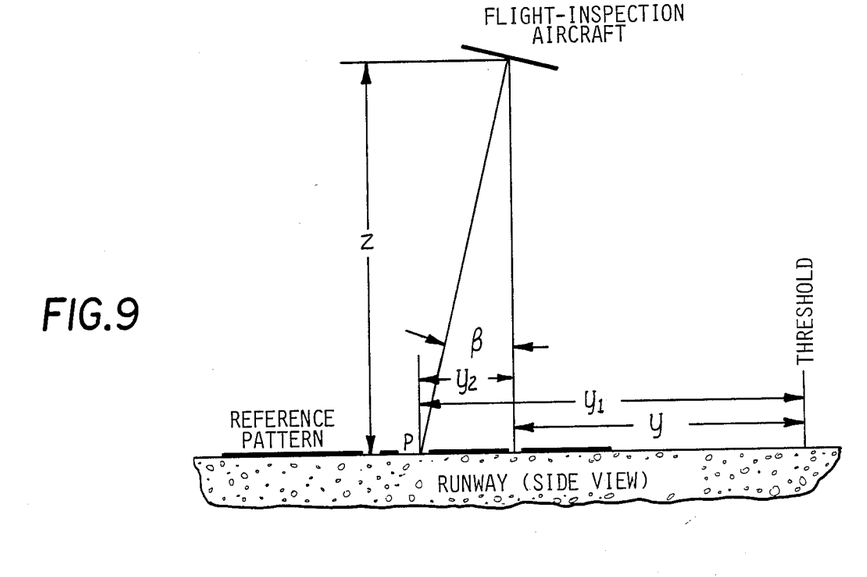
FIG. 9 is a diagrammatic side view of an aircraft and runway having the runway pattern depicted in FIG. 3.

With reference now to FIGS. 8 and 9 an aircraft and runway having the reference pattern template of the present invention is depicted to explain the computation of aircraft position relative to the runway. The position of the flight-inspection aircraft is defined with respect to a reference point on the runway where the centerline of the runway intersects the threshold line. The position of the aircraft is described in Cartesian coordinates as follows:

x=displacement from the centerline;
y=displacement from the threshold along the centerline;
z=altitude above the runway surface.

The runway surface is assumed for calculations to be essentially flat and level. During flight inspection path profiles the aircraft pitch angle is relatively small, less than 6° and the aircraft roll angle is also relatively small, less than 10°. Therefore, secondorder coupling terms are negligibly small. By applying small-angle approximations, the altitude above the runway, with precision sufficient for instrument landing system inspection, is given by:

$$z = r \cos(\alpha^2 + \beta^2)^{\frac{1}{2}}$$

where:
r=range to the runway surface measured by the laser altimeter;
$\alpha$=aircraft roll angle;
$\beta$=aircraft pitch angle.

By applying small-angle approximations, the x and y components of the aircraft position are independently derived. Referring to FIG. 8, the value of the cross-track component x is determined by the position of the reference pattern image on the photosensitive array of the line-scan camera, the aircraft roll angle and the aircraft altitude as given by the following equation:

$$x = z(\tan \alpha - \Delta/f) \text{ where:}$$
z=true altitude above the runway;
$\alpha$=aircraft roll angle;

$\Delta$=displacement of the referenced pattern centerline image from the optic axis;
f=focal length of the camera lens.

The distance $\Delta$ is measured by multiplying the difference between the time intervals from the start of a line scan to the occurrence of the correlation peak, and that which corresponds to the reference pattern centerline image coinciding with the optic axis, by the line scan rate.

The on-track component y of the aircraft position is measured by first determining from the laser altimeter slant range and camera optics, the point P on the runway reference pattern where the size of its image on the camera's line array equals that of the correlator's reference pattern (see FIG. 3). At the instant the maximum correlation occurs, the aircraft on-track position may be understood by reference to FIG. 9 and the following equation:

$$y = y_1 + z \tan \beta$$

where:
y=aircraft distance to the shortest threshold point;
$y_1$=distance from P to the threshold point;
z=true altitude above runway;
$\beta$=aircraft pitch angle.

In the illustrated case, the pitch angle is negative as is typical with actual flight inspection paths. Thus, the term $z \tan \beta$ is also negative which results in y being smaller than $y_1$.

Figure 10:
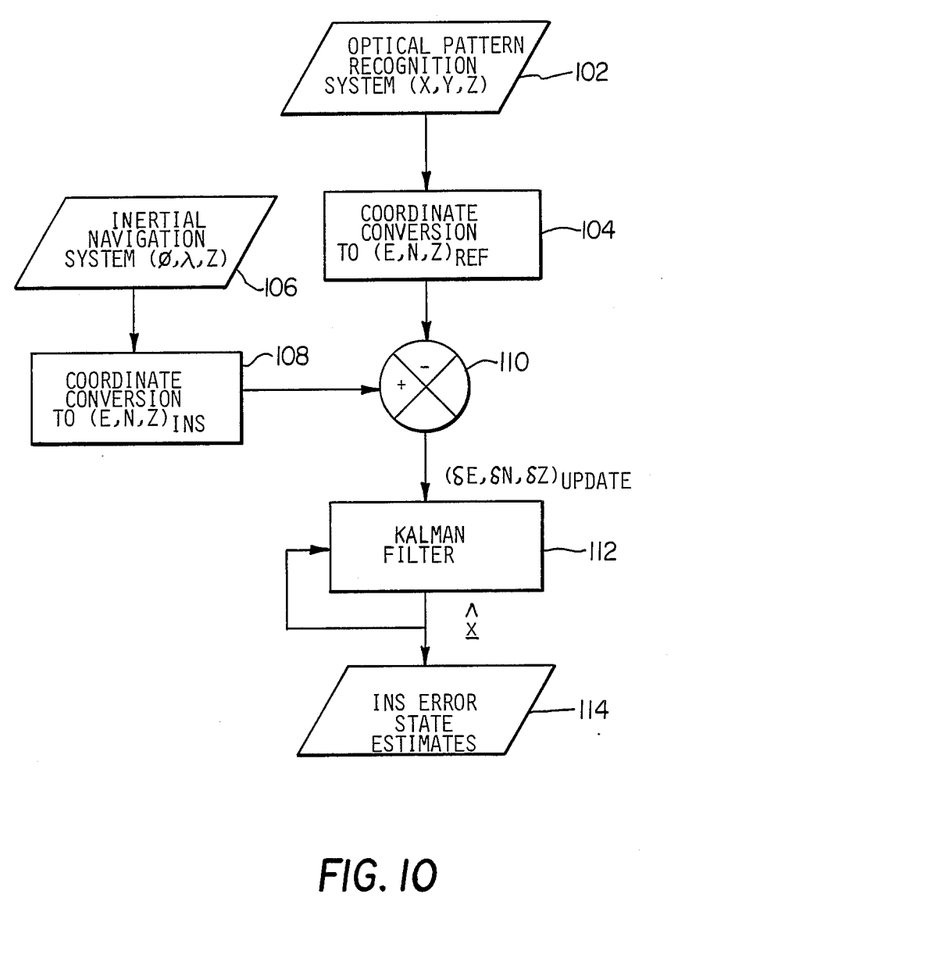
FIG. 10 is a flow chart illustrating the steps for using the optical pattern recognition system position coordinates to update an inertial navigation system error estimate.

FIG. 10 illustrates the use of the optical pattern recognition system to update an inertial navigation system error state estimate based upon the precision position calculations of the optical pattern recognition system.

FIG. 10 is a flow chart of the processing utilized to perform an update in a conventional Kalman Filter. The optical pattern recognition system 102 (OPRS) provides the coordinates (x,y,z) where x is distance across runway centerline, y is distance along runway centerline and z is vertical. A standard coordinate conversion 104, in this case a simple rotation, converts these runway coordinates into precise east, north, and vertical coordinates (E, N, Z) $_{REF}$ of the aircraft at the instant of pattern passage.

The INS 106 provides time tagged latitude ($\phi$), longitude ($\lambda$) and altitude (Z) which are interpolated to obtain the INS measured position at the time of pattern overflight. These geodetic coordinates are converted 108 into East, North and vertical coordinates (E, N, Z) $_{INS}$ with respect to the plane tangent to the earth at runway pattern. Standard geodetic to planar coordinate conversions which account for the ellipticity of the earth are used for this step.

At this point in the processing 110, we have two opinions of the position of the aircraft at the instant of pattern overflight, from the INS and the OPRS. The error in the INS measured position is typically on the order of hundreds of feet. The OPRS error is on the order of inches. The precision position obtained at each overflight of the runway pattern is used to make an update in the classic Kalman Filter sense of the estimate of the errors in the Inertial Navigation System (INS). The simple algebraic difference between the two is an excellent estimate of the INS error for that instant of time.

Therefore, this difference is used as the measurement vector in the standard Kalman Filter 112 on the error in the INS. In the Kalman Filter, the error state vector 114 is the estimate of the INS error states as to position, velocity, gyro drift rates, accelerometer biases, and mislevel. This error state vector is time varying and as a result, a time sequence of OPRS updates will provide increasingly improved estimates of the states representing higher derivatives. The first pass provides excellent position, the second pass provides velocity and so on.

These INS error state estimates are then used by the flight inspection computer to correct the INS measurements made from the Outer Marker down to the runway. These corrected INS measurements are used in turn as the reference for determination of the localizer and glidepath error in the Instrument Landing System being inspected.

Also included in FIG. 6 is illumination system 76 which may be utilized to illuminate runway 10 and pattern 12 so that flight inspection can be accomplished during night hours. It should also be noted that in view of the fact that pattern 12 is not symmetrical, it will be necessary to provide an inbound/outbound signal to correlator 66 so that the reference pattern template may be reversed to detect pattern 12.

Figure 7:
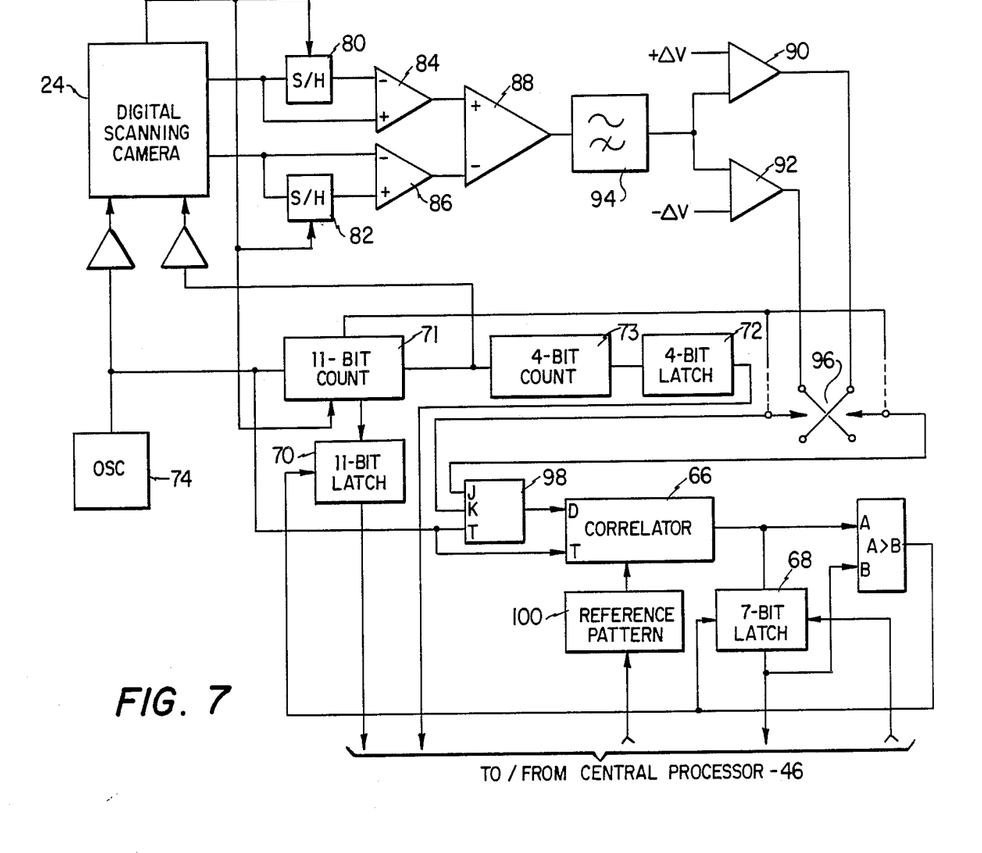
FIG. 7 is a more detailed block diagram of the video position reference system of the novel flight inspection system of the present invention.

With reference now to FIG. 7, there is depicted a more detailed block diagram of the video position reference system of FIG. 5. As can be seen, digital line scanning camera 24 produces, in the depicted embodiment, two output video channels 76 and 78. In a preferred embodiment of the present invention, digital scanning camera 24 is implemented utilizing an industrial line scan camera such as the Model CCD 1300R manufactured by Fairchild Camera and Instrument Corporation of Palo Alto, Calif. This particular model utilizes CCD imaging techniques and puts out two time division multiplex video outputs.

In order to extract the essential features of geometric pattern 12 over a wide range of absolute image brightness, analog video outputs 76 and 78 are coupled into a pair of wide-band logarithmic response amplifiers 84 and 86. In a preferred embodiment of the present invention an independent auto-biasing circuit is utilized in conjunction with each logarithmic response amplifier to establish a precise black level operating point. This is achieved by activating the sample state of sample-and-hold circuits 80 and 82 at a pixel count which coincides with the black reference video output level.

The outputs of logarithmic response amplifiers 84 and 86 are then coupled to linear difference amplifier 88. Those ordinarily skilled in the art will appreciate that the well known mathematical properties of logarithms will result in the output of difference amplifier 88 being a constant value for sets of video input signals having a constant ratio, regardless of absolute value. Since the two video channel odd/even format produces light intensity levels of adjacent pixels simultaneously, the difference amplifier output indicates the ratio of light intensity change between adjacent pixels. However, a polarity reversal is introduced each pixel period because of the alternating sign of the most recent data.

Although a sharp black-to-white or white-to-black transition is the video feature being sought, allowance must be made for the possibility of the edge of geometric pattern 12 falling in the center of a pixel sensing element producing an intermediate average intensity. For this reason, the ratio threshold value must be set at somewhat less than a ratio of two-to-one to ensure adequate probability of detection. Voltages corresponding to the threshold ratio and its reciprocal are supplied to a pair of analog comparator amplifiers 90 and 92 which are coupled to the output of high pass filter 94. The outputs of analog comparator amplifiers 90 and 92 are then decommutated on an odd/even basis utilizing switch 96. The resultant ouptut enables the setting and clearing of bistable multivibrator 98 which produces a one-bit quantized video output which is required by digital correlator 66. In the depicted mode of the present invention, the state of that bit will be zero for a black detection and one for a white detection.

As explained above, a digital reference pattern is stored within reference pattern register 100 and then correlated with the digitized output of a line scanning camera to determine the detection of geometric pattern 12. Digital peak detector 68 is implemented utilizing a seven-bit latch and is updated each time the output of correlator 66 is greater than a previous output. Oscillator 74 is utilized to generate timing pulses, and cross-track register 70 and scan number register 72 are implemented utilizing an eleven-bit latch and a four-bit latch respectively. Eleven-bit counter 71 is utilized in conjunction with cross-track register 70 and four-bit counter 73 is utilized in conjunction with scan number register 72.

Those ordinarily skilled in the art will appreciate upon reference to the foregoing specification that when utilizing the video position reference system of the present invention of an inspection aircraft may fly over an airport runway and utilize visual information to obtain a substantially exact reference position of the aircraft with respect to the runway which may then be utilized to upgrade the onboard inertial navigation system to an accuracy sufficient to permit Class III instrument landing systems to be calibrated.

Although the invention has been described with reference to a specific embodiment, this description is not meant to be construed in a limiting sense. Various modifications of the disclosed embodiment as well as alternate embodiments of the invention will become apparent to persons skilled in the art upon reference to the description of the invention. It is therefore contemplated that the appended claims will cover any such modifications or embodiments that fall within the true scope of the invention.

What is claimed is:

1. A computerized flight inspection system for providing an accurate reference location with respect to a runway for an aircraft having an inertial navigation system, said flight inspection system comprising:
   selected indicia disposed on at least one end of an airport runway;
   video scanning means disposed within said aircraft for scanning said selected indicia in a line generally perpendicular to said aircraft's line of flight and for generating an output indicative of the scanned video pattern;
   memory means for storing a reference video pattern;
   correlator means coupled to said video scanning means and said memory means for correlating said scanned video pattern and said reference video pattern;
   altimeter means for measuring the altitude of said aircraft and for generating a signal indicative thereof; and
   processor means coupled to said correlator means and said altimeter means for generating correction data for said inertial navigation system in response to said correlation and said altitude measurement.

2. The computerized flight inspection system according to claim 1 wherein said selected indicia comprises a selected geometric pattern.

3. The computerized flight inspection system according to claim 1 wherein said video scanning means comprises a solid state line scan camera.

4. The computerized flight inspection system according to claim 3 wherein said solid state line scan camera includes a charge couple device line scan image sensor.

5. The computerized flight inspection system according to claim 4 wherein said charge couple device line scan image sensor includes a single row of 1,024 image sensing elements.

6. The computerized flight inspection system according to claim 1 wherein said correlator means comprises a sixty-four bit monolithic digital correlator.

7. The computerized flight inspection system according to claim 1 wherein said altimeter means comprises a laser altimeter.

8. The computerized flight inspection system according to claim 1 wherein said processor means comprises an appropriately programmed microprocessor.

9. The computerized flight inspection system according to claim 1 wherein said memory means comprises a parallel-in-serial-out shift register.

10. The computerized flight inspection system according to claim 1 wherein said selected indicia disposed on at least one end of an airport runway comprises two identical indicia disposed on opposite ends of an airport runway.

11. A computerized flight inspection system for providing an accurate reference location with respect to a runway for an aircraft having an inertial navigation system, said flight inspection system comprising:
   selected indicia disposed on at least one end of an airport runway;
   video scanning means disposed within said aircraft for scanning said selected indicia in a line generally perpendicular to said aircraft's line of flight and for generating an output indicative of the scanned video pattern;
   inertial navigation means for generating a plurality of signals indicative of aircraft position and attitude;
   memory means for storing a reference video pattern;
   correlator means coupled to said video scanning means and said memory means for correlating said scanned video pattern and said reference video pattern;
   altimeter means for measuring the altitude of said aircraft and for generating a signal indicative thereof; and
   processor means coupled to said inertial navigation system, said memory means, said correlator means and said altimeter means for modifying said reference video pattern in response to said plurality of signals indicative of aircraft position and attitude and said altitude signal; and for generating correction data for said inertial navigation means in response to the altitude and attitude of said aircraft and the output of said correlator means.

12. The computerized flight inspection system according to claim 11 wherein said selected indicia comprises a selected geometric pattern.

13. The computerized flight inspection system according to claim 11 wherein said video scanning means comprises a solid state line scan camera.

14. The computerized flight inspection system according to claim 13 wherein said solid state line scan camera includes a charge couple device line scan image sensor.

15. The computerized flight inspection system according to claim 14 wherein said charge couple device line scan image sensor includes a single row of 1,024 image sensing elements.

16. The computerized flight inspection system according to claim 11 wherein said correlator means comprises a sixty-four bit monolithic digital correlator.

17. The computerized flight inspection system according to claim 11 wherein said altimeter means comprises a laser altimeter.

18. The computerized flight inspection system according to claim 11 wherein said processor means comprises an appropriately programmed microprocessor.

19. The computerized flight inspection system according to claim 11 wherein said memory means comprises a parallel-in-serial-out shift register.

20. The computerized flight inspection system according to claim 11 wherein said selected indicia disposed on at least one end of an airport runway comprises two mirror image indicia disposed on opposite ends of an airport runway.

* * * * *

UNITED STATES PATENT AND TRADEMARK OFFICE
CERTIFICATE OF CORRECTION

PATENT NO. : 4,792,904

DATED : December 20, 1988

INVENTOR(S) : Frederick G. Reinagel, et al.

It is certified that error appears in the above-identified patent and that said Letters Patent is hereby corrected as shown below:

| | |
|---|---|
| Column 1, Line 14 | After "with" delete --a--. |
| Column 2, Lines 38 and 39 | "references" should be --reference--. |
| Column 5, Line 45 | "60" should be --6°--. |
| Column 6, Line 50 | After "at" insert --the--. |
| Column 7, Lines 33 and 34 | "multiplex" should be --multiplexed--. |
| Column 8, Line 4 | "ouptut" should be --output--. |
| Column 8, Line 27 | After "invention" delete --of--. |
| Column 8, Lines 37 and 38 | "alternate" should be --alternative--. |

Signed and Sealed this

Twenty-third Day of May, 1989

Attest:

DONALD J. QUIGG

*Attesting Officer*  *Commissioner of Patents and Trademarks*